(12) United States Patent
Lakshmanamurthy et al.

(10) Patent No.: US 9,489,329 B2
(45) Date of Patent: *Nov. 8, 2016

(54) SUPPORTING MULTIPLE CHANNELS OF A SINGLE INTERFACE

(71) Applicant: INTEL CORPORATION, Santa Clara, CA (US)

(72) Inventors: Sridhar Lakshmanamurthy, Sunnyvale, CA (US); Mikal C. Hunsaker, El Dorado Hills, CA (US); Michael T. Klinglesmith, Portland, OR (US); Blaise Fanning, Folsom, CA (US); Eran Tamari, Ramat Gan (IL); Joseph Murray, Scottsdale, AZ (US); Rohit R. Verma, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 216 days.

This patent is subject to a terminal disclaimer.

(21) Appl. No.: 14/209,146

(22) Filed: Mar. 13, 2014

(65) Prior Publication Data

US 2014/0258578 A1 Sep. 11, 2014

Related U.S. Application Data

(63) Continuation of application No. 13/248,270, filed on Sep. 29, 2011, now Pat. No. 8,713,234.

(51) Int. Cl.
*G06F 13/36* (2006.01)
*G06F 13/00* (2006.01)
(Continued)

(52) U.S. Cl.
CPC ........... *G06F 13/364* (2013.01); *G06F 13/362* (2013.01); *G06F 9/44* (2013.01); *G06F 15/16* (2013.01)

(58) Field of Classification Search
CPC ........ G06F 13/36; G06F 13/00; G06F 15/16; G06F 9/44
See application file for complete search history.

(56) References Cited

U.S. PATENT DOCUMENTS 6,330,647 B1 12/2001 Jeddeloh et al.
6,430,182 B1 8/2002 Oyama
(Continued)

FOREIGN PATENT DOCUMENTS

CN 1819555 8/2006
CN 1833415 9/2006
(Continued)

OTHER PUBLICATIONS

U.S. Patent and Trademark Office, Office Action mailed Dec. 3, 2013, with Reply filed Feb. 26, 2014, in U.S. Appl. No. 13/248,234.
(Continued)

*Primary Examiner* — Henry Tsai
*Assistant Examiner* — Christopher a Daley
(74) *Attorney, Agent, or Firm* — Trop, Pruner & Hu, P.C.

(57) ABSTRACT

In one embodiment, the present invention includes a method for receiving a request for a transaction from a first agent in a fabric and obtaining an address, a requester identifier, a tag, and a traffic class of the transaction, and determining a channel of a target agent to receive the transaction based on at least two of the address, the requester identifier, the tag, and the traffic class. Based on this channel determination, the transaction can be sent to the channel of the target agent. Other embodiments are described and claimed.

24 Claims, 10 Drawing Sheets

(51) Int. Cl.
*G06F 13/364* (2006.01)
*G06F 13/362* (2006.01)
G06F 15/16 (2006.01)
G06F 9/44 (2006.01)

(56) References Cited

U.S. PATENT DOCUMENTS

| | | | |
|---|---|---|---|
| 6,469,982 | B1 | 10/2002 | Henrion et al. |
| 7,239,642 | B1* | 7/2007 | Chinn ............... H04L 47/10 370/401 |
| 7,415,533 | B1 | 8/2008 | Lacroute et al. |
| 7,421,543 | B2 | 9/2008 | Suzuki |
| 7,793,345 | B2* | 9/2010 | Weber ............... G06F 21/78 726/2 |
| 8,069,286 | B1* | 11/2011 | Orthner ............ G06F 15/7867 370/231 |
| 2003/0227926 | A1 | 12/2003 | Ramamurthy et al. |
| 2004/0218600 | A1 | 11/2004 | Alasti et al. |
| 2005/0137966 | A1* | 6/2005 | Munguia ............ G06Q 40/025 705/38 |
| 2006/0101179 | A1 | 5/2006 | Lee et al. |
| 2009/0006165 | A1 | 1/2009 | Teh et al. |
| 2009/0248940 | A1 | 10/2009 | Marino et al. |
| 2009/0296624 | A1 | 12/2009 | Ryu et al. |
| 2009/0300245 | A1 | 12/2009 | Shoemaker et al. |
| 2009/0310616 | A1 | 12/2009 | Cummings et al. |
| 2010/0220703 | A1 | 9/2010 | Farrugia et al. |
| 2010/0235675 | A1* | 9/2010 | Subramanian ...... G06F 13/4022 713/600 |
| 2010/0293304 | A1 | 11/2010 | Alexandron et al. |
| 2010/0312942 | A1 | 12/2010 | Blinick et al. |
| 2011/0032947 | A1 | 2/2011 | Brueggen |
| 2011/0238728 | A1 | 9/2011 | Nagarajao et al. |
| 2012/0051297 | A1 | 3/2012 | Lee et al. |
| 2012/0303842 | A1 | 11/2012 | Cardinell et al. |
| 2012/0303899 | A1 | 11/2012 | Ash et al. |
| 2013/0054845 | A1* | 2/2013 | Nimmala ............ G06F 13/4022 710/36 |
| 2013/0054871 | A1* | 2/2013 | Lassa ................. G06F 3/061 711/103 |
| 2013/0089095 | A1 | 4/2013 | Chen et al. |

FOREIGN PATENT DOCUMENTS

| | | |
|---|---|---|
| CN | 101267376 | 9/2008 |
| CN | 101558589 | 10/2009 |
| CN | 101873339 | 10/2010 |
| EP | 1328104 | 7/2003 |
| EP | 2216722 A2 | 8/2010 |
| JP | 2007-135035 | 5/2007 |
| WO | 2010102055 | 9/2010 |
| WO | 2010137572 | 12/2010 |

OTHER PUBLICATIONS

U.S. Patent and Trademark Office, Final Office Action mailed Jun. 13, 2014, with Reply to Final filed Aug. 7, 2014 in U.S. Appl. No. 13/248,234.
U.S. Patent and Trademark Office, Final Office Action mailed Apr. 8, 2014, with Reply filed Jun. 6, 2014, in U.S. Appl. No. 13/248,252.
U.S. Patent and Trademark Office, Office Action mailed Apr. 23, 2014, with Reply filed Jul. 22, 2014, in U.S. Appl. No. 13/222,362.
U.S. Patent and Trademark Office, Office Action mailed Mar. 31, 2014, with Reply filed Jun. 26, 2014, in U.S. Appl. No. 13/222,354.
U.S. Patent and Trademark Office, Final Office Action mailed Jul. 7, 2014, with Reply filed Aug. 22, 2014 in U.S. Appl. No. 13/222,354.
U.S. Patent and Trademark Office, Office Action mailed Oct. 23, 2013, with Reply filed Jan. 22, 2014, in U.S. Appl. No. 13/306,244.
U.S. Patent and Trademark Office, Final Office Action mailed Apr. 30, 2014, with PreAppeal Request and Notice of Appeal filed Jul. 23, 2014 in U.S. Appl. No. 13/306,244.
PCI-SIG, "PCI Local Bus Specification, Revision 3.0," Feb. 3, 2004, 3 pages.
U.S. Appl. No. 14/326,654, filed Jul. 9, 2014, entitled "Common Idle State, Active State and Credit Management for an Interface", by Sridhar Lakshmanamurthy, et al.
U.S. Appl. No. 14/209,207, filed Mar. 13, 2014, entitled "Aggregating Completion Messages in a Sideband Interface", by Sridhar Lakshmanamurthy, et al.
U.S. Appl. No. 14/209,184, filed Mar. 13, 2014, entitled "Providing Multiple Decode Options For a System-on-Chip (SoC) Fabric", by Sridhar Lakshmanamurthy, et al.
U.S. Appl. No. 14/295,810, filed Jun. 4, 2014, entitled "Issuing Requests to a Fabric", by Sridhar Lakshmanamurthy, et al.
U.S. Patent and Trademark Office, Office Action mailed Jul. 22, 2014, in U.S. Appl. No. 14/295,810.
Japan Patent Office, Office Action mailed Nov. 24, 2015 in Japanese Patent Application No. 2015-002299.
European Patent Office, Extended European Search Report mailed Oct. 9, 2015 in European Patent Application No. 15177163.1.
China Patent Office, Office Action mailed Nov. 3, 2015 in Chinese Patent Application No. 201280047815.4.
China Patent Office, Office Action mailed Dec. 3, 2015 in Chinese Patent Application No. 201280058462.8.

\* cited by examiner

SUPPORTING MULTIPLE CHANNELS OF A SINGLE INTERFACE

This application is a continuation of U.S. patent application Ser. No. 13/248,270, filed Sep. 29, 2011, the content of which is hereby incorporated by reference.

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultra-mobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC. One such interface issue is whether an IP block supports multiple channels. Available interfaces support independent channels on a single interface, or support only limited attributes to define a channel. For example, the PCIe™ specification defines channels solely based on traffic class, which prevents ready reuse of IP blocks.

DETAILED DESCRIPTION

Figure 1:
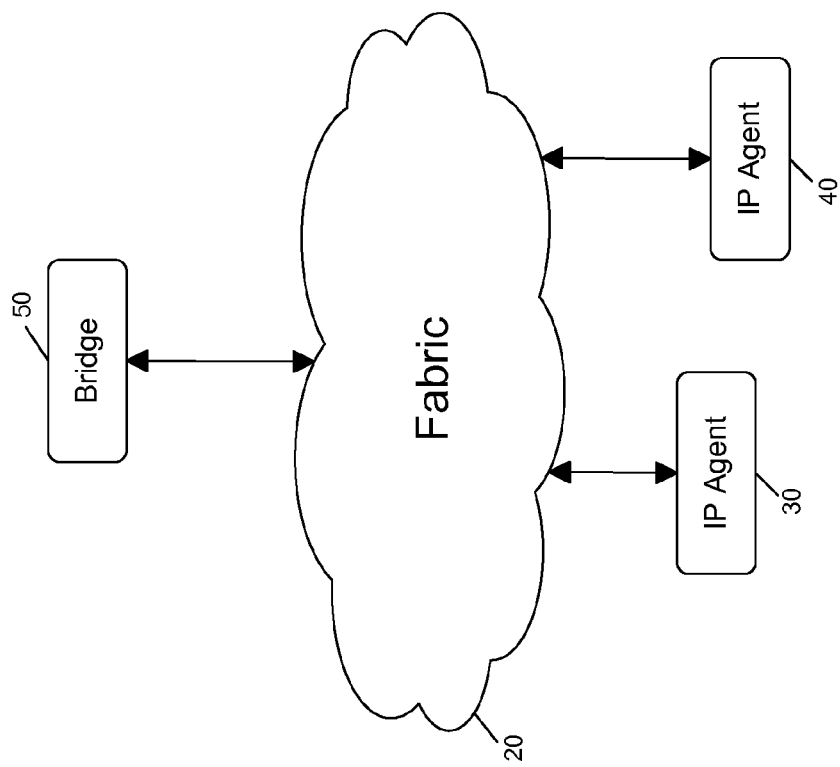
FIG. 1 is a block diagram of a basic interconnect architecture in accordance with an embodiment of the present invention.

By providing multiple channels each having dedicated resources in an interface, independent data flows through the interface can be realized. Embodiments may provide for various channel mapping options in a system-on-chip (SoC), and associated rules for agents and fabrics of the SoC. In this way, an agent designed in accordance with an embodiment of the present invention can easily be reused in different systems. More specifically, different channels of a single interface of an agent can be mapped according to selected ones of multiple attributes of a transaction, providing much flexibility. Such flexibility enhances the ability to provide different measures of quality of service (QoS) by these different channel mapping options. For example by different mappings, traffic having different latencies can be handled through channels accordingly. Such QoS can be realized in part by providing arbitration of different channels' traffic in a manner that accounts for priority of the different channels. In addition, the different channel mappings enable different functions or agents of an SoC to be clustered together as desired.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
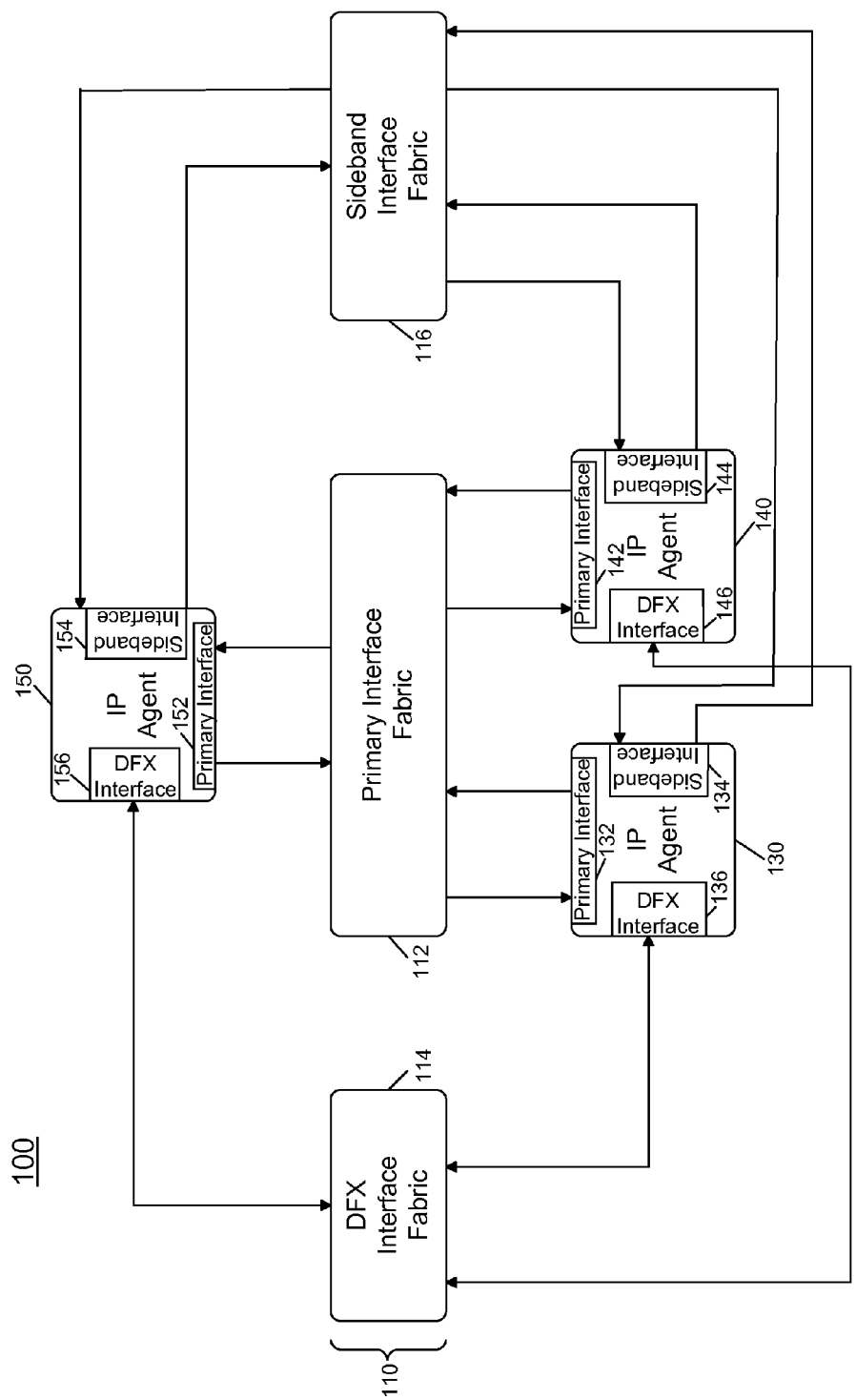
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
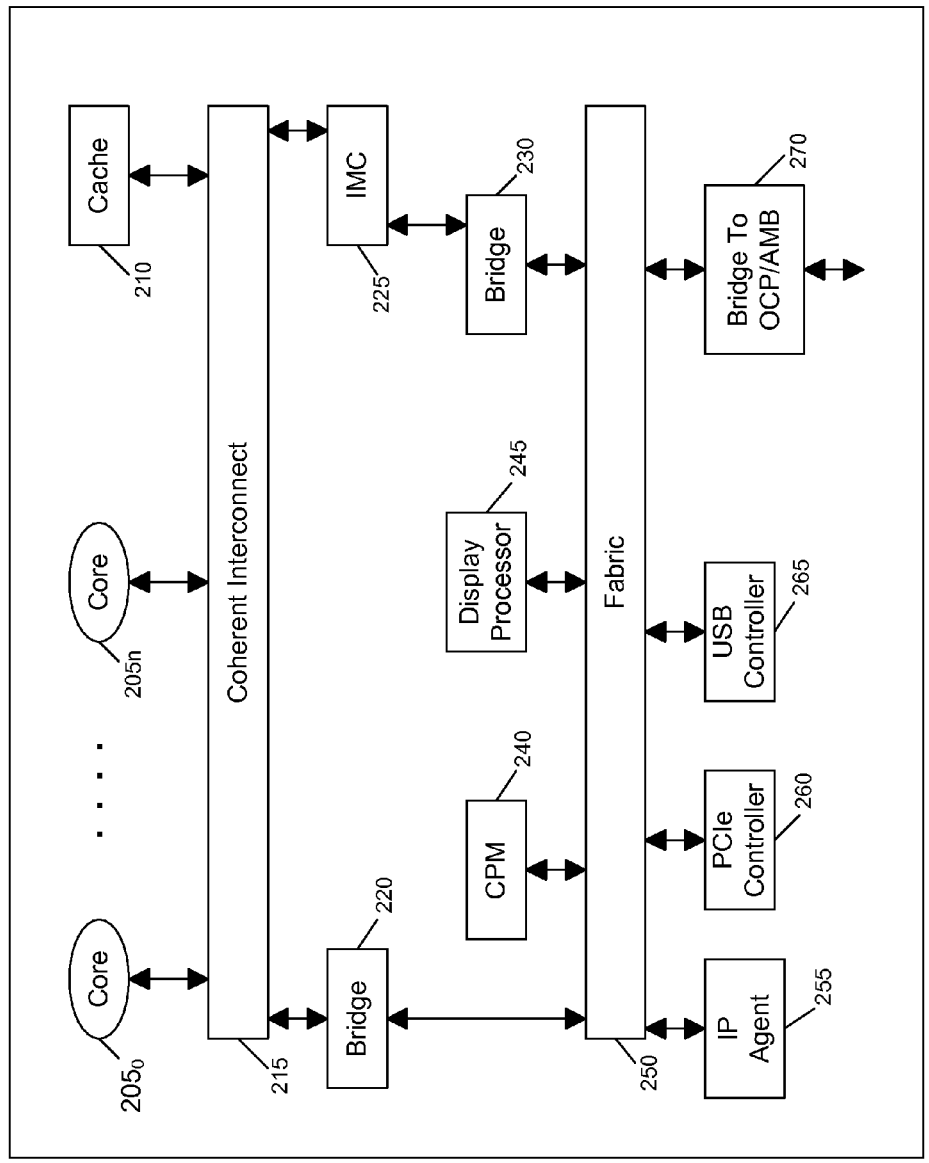
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
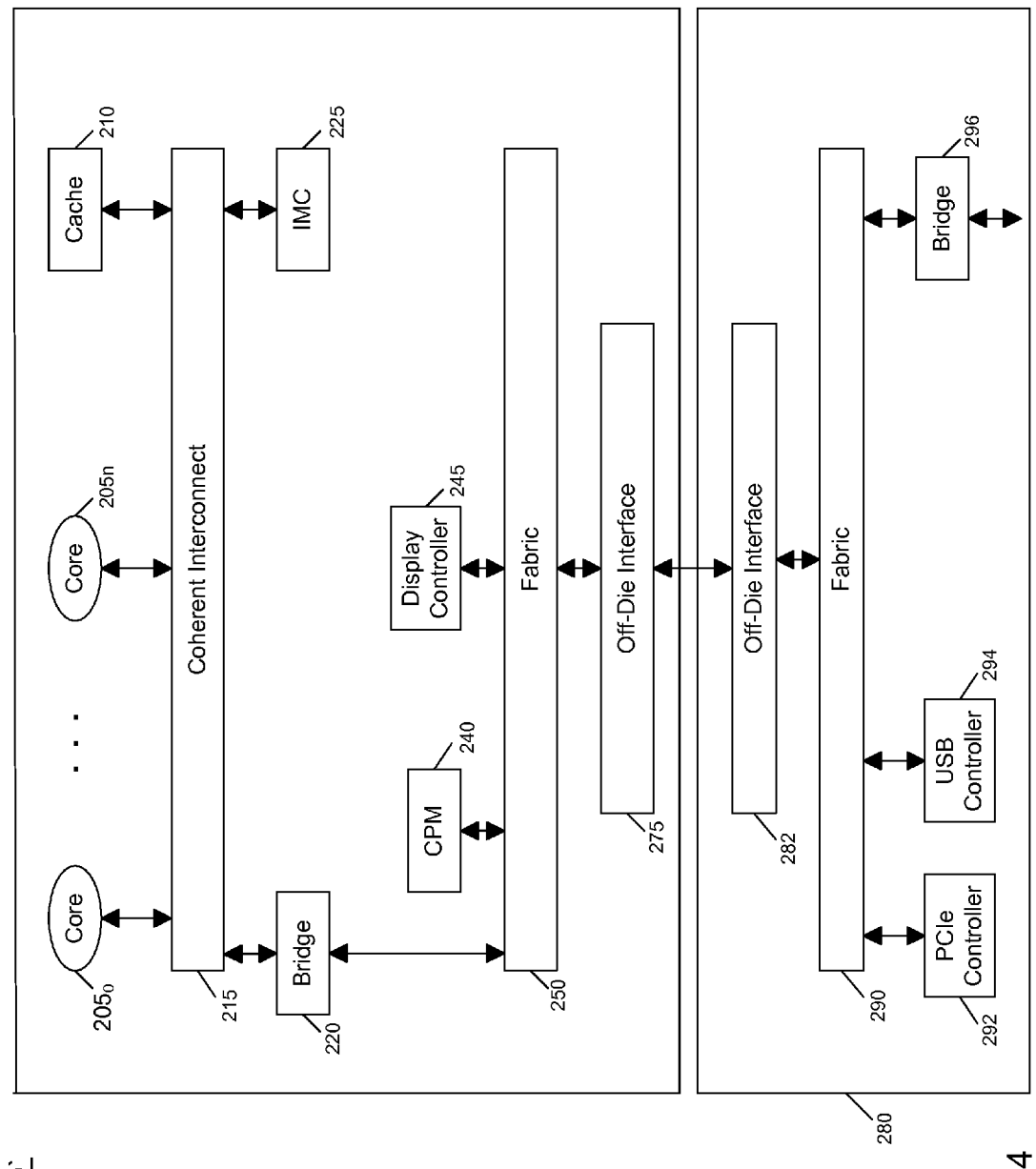
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Each independent pathway over a shared primary interface is referred to as a channel and is identified by a channel ID (CHID) unique to the interface. These channels identify dedicated buffer resources or physical queues within the agent and fabric. Fabric arbiters may provide independent request queues for each channel supported by the master agent, but it is a fabric and target agent's choice on the number of channels implemented in the fabric and target agent. Further, there is no relationship between the channel ID of a master agent and the channel ID of a target agent. Agents can support any number of channels over a primary interface. Channels on both the master and target interface of an agent can be based on the command attributes of transactions in an independent data flow.

In one embodiment, a combination of the following command attributes can be used for channel mapping:

Traffic class (TC): agents can define channels based on a TC command attribute. A channel that uses traffic class mapping is referred to as a virtual channel (VC). Transactions with different quality of service (QoS) requirements can be labeled using a TC field of command portion of a transaction, which in one embodiment can be a 4-bit field to support up to 16 different traffic classes.

Requester ID and transaction address: these attributes can be used by PCI/PCIe™ compliant agents to define channels for different PCI/PCIe™ functions in the agent. In one embodiment, each channel may represent a different PCI/PCIe™ function with its own requester ID. Channel mapping may be based on requester ID for so-called "route by ID" transactions (e.g., configuration, completions, and other route-by-ID messages). Memory/IO transactions can be mapped based on base address registers (BARs) supported by each function.

Tags: in the case of PCI/PCIe™ compliant agents, a single function agent with one requester ID can use a tag attribute of a command portion of a transaction for defining channels for multiple ports in the agent. One example of this case is a serial advanced technology attach (SATA) controller that is a single function agent. Each SATA port in this agent can have its own channel, and channel mapping can be based on tag. CPU configuration requests may always be sent to channel 0 if the agent configuration space is defined in channel 0. CPU memory requests may be routed to different channels based on how the SATA controller divides up its address space. Completions to the SATA controller can be mapped based on the tag of the original request. In some embodiments, non-PCI compliant agents can also use tags to define channels for independent data flows in the agent.

Besides the attributes mentioned above, agents can use other command attributes for channel mapping. As examples, addresses may also be used for channel mapping purposes. In various embodiments, an agent can also define channel mapping with a combination of these attributes. For example, a 2x1 PCIe™ root port agent that supports virtual channels on each link can map transactions based on requester ID and transaction address to different ports in the agent and then use TCs to map into different virtual channels within each port.

A fabric coupled to a master agent may service an incoming request based on the master agent's CHID (e.g., as determined by resources available for the given CHID), but then remap the incoming transaction to a target agent's CHID. That is, channel IDs are local to the agent and interface, but transaction attributes travel with the command and can be used to determine the CHID used to communicate between the fabric and a transaction's target agent. For fabrics that implement fabric decode, the fabric may store or otherwise shadow a mapping definition from each of its targets to perform this mapping function. Fabrics that use target decode can make use of a mapping function performed in each of the targets to determine the proper channel within a target.

Figure 5:
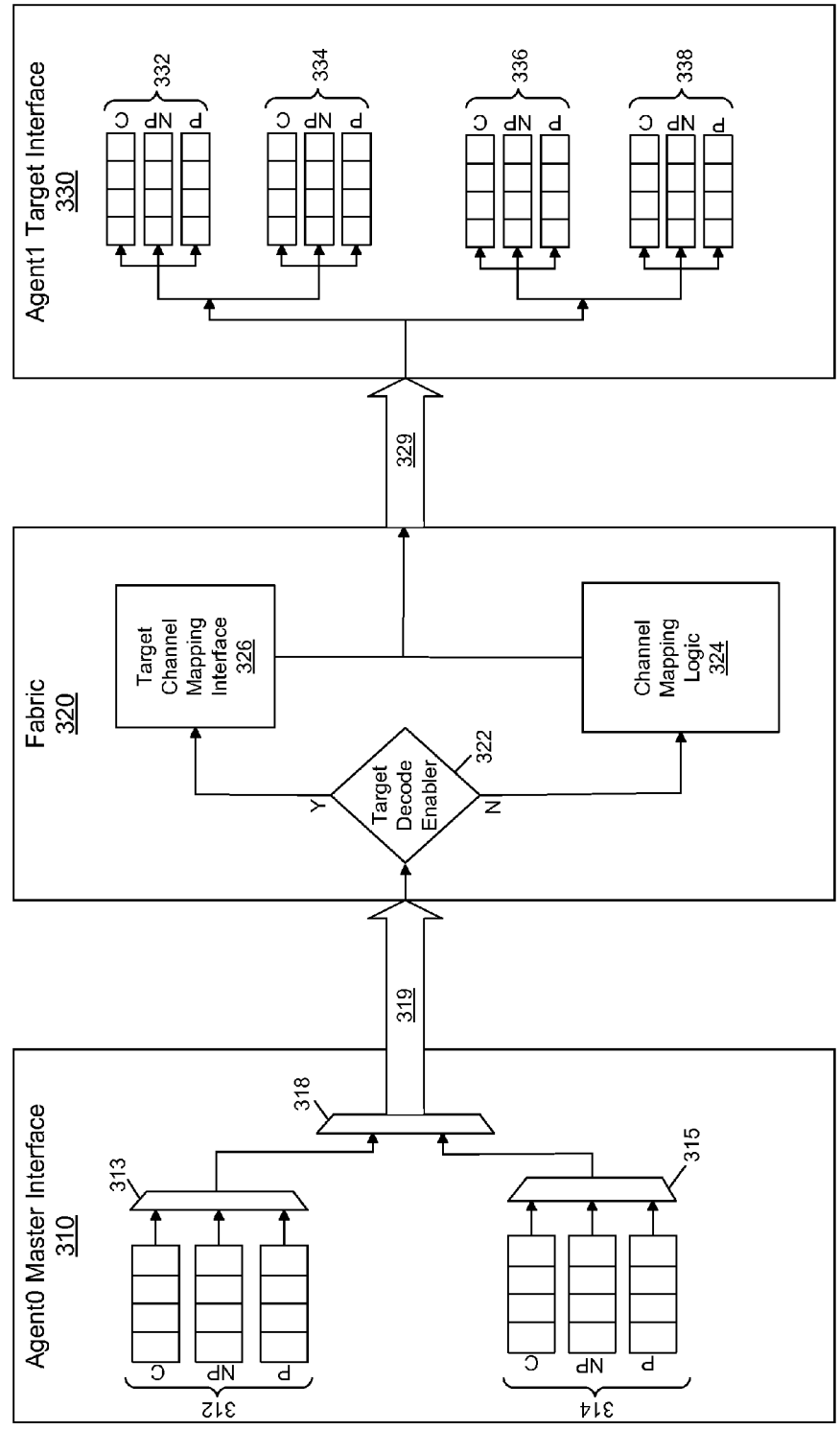
FIG. 5 is a block diagram of components of a SoC in accordance with an embodiment of the present invention.

Referring now to FIG. 5, shown is a block diagram of components of a SoC in accordance with an embodiment of the present invention. More specifically, FIG. 5 shows a portion of a system 300 including multiple IP agents, namely a first agent 310 (Agent0) and a second agent 330 (Agent1) that are interconnected via a fabric 320. As described herein, agent 310 may act as a master agent to communicate transactions that in turn are destined for agent 330, which thus acts as a target agent. Accordingly, shown in FIG. 5 are only the master interface of first agent 310 and the target interface of the second agent 330. As seen, the master interface includes multiple channels, namely a first channel 312 and a second channel 314. As seen, each channel includes queues for different types of transactions, namely posted (P), non-posted (NP), and completions (C). The transactions of each of the channels may be coupled to a multiplexer 313 and 315, which in turn may be controlled to provide a selected output to another multiplexer 318 which thus multiplexes the various channels onto a single interface 319 coupled between agent 310 and fabric 320. Similarly, a downstream interconnect 329 couples fabric 320 to second agent 330. As seen, second agent 330 includes a target interface having four channels, namely channels 332, 334, 336 and 338, each of which includes queues for the different request types.

First agent 310 sends transaction requests to fabric 320 using its own channel mapping. In turn, fabric 320, before sending a transaction to target agent 330, determines the corresponding target channel. In a target decode implementation, the fabric directly uses Agent1's mapping definition to determine the target channel by making target decode requests to Agent1. In this case, transactions do not go through TC-based or other attributes-based mapping logic in the fabric. In a fabric decode implementation, the fabric determines the target agent's mapping definition, e.g., based on information present in the fabric. Thus as seen in FIG. 5, fabric 320 may include a target channel mapping interface 326 and a channel mapping logic 324, in addition to a target decode enabler 322. Based on either a hard-coded configuration of the fabric, load, request type or so forth, enabler 322 either sends the incoming transactions to target channel mapping interface 326, which may then prepare and send the command portion of the transaction (at least) to target agent 330 and other various possible target agents (not shown for ease of illustration in FIG. 5) to perform target decode, including target channel mapping.

Otherwise, if a fabric decode option is selected, the incoming transaction can be provided to channel mapping logic 324, which thus determines the appropriate target agent, as well as the corresponding channel of the target agent on which the transaction is to flow. Although shown with this high level view in the embodiment of FIG. 5, understand the scope of the present invention is not limited in this regard.

As mentioned before, transactions on the target interface of agents can be mapped based on address, requester ID, tags, and/or traffic classes. In one example, transactions first go through an address, requester ID, and tag-based mapping, and then go through a TC/VC mapping to map to one of the target agent's four channels.

Figure 6:
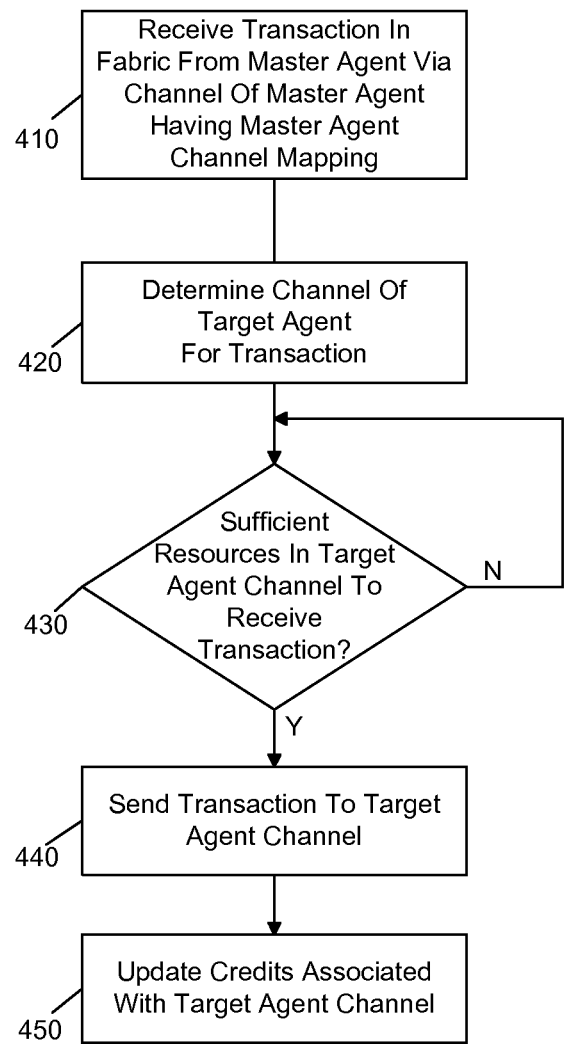
FIG. 6 is a flow diagram of a method in accordance with an embodiment of the present invention.

Referring now to FIG. 6, shown is a flow diagram of a method in accordance with an embodiment of the present invention. As shown in FIG. 6, method 400 may be implemented in a fabric to handle incoming transactions from a master agent and to forward the transactions along to appropriate target agents based at least in part on channel mappings with regard to the target agents. As seen in FIG. 6, method 400 may begin by receiving a transaction in a fabric from a master agent. More specifically, at block 410 a transaction may be received in a fabric via a channel of the master agent having a channel mapping defined by the master agent. Assume for purposes of discussion that the transaction is received from a channel of the master agent having a CHID of one.

As further seen in FIG. 6, a channel of the target agent may be determined for the transaction (block 420). Of course, prior to or in connection with determining the channel, the target agent itself is also determined. In various embodiments, different decode options may be implemented by the fabric and accordingly, this determination of channel (and target agent) may also vary. For example, a fabric may implement fabric decode, target decode or both fabric and target decode options. Accordingly, so too can the channel of the target agent be determined in connection with the corresponding decode option.

When it is determined the appropriate target and its channel, control passes to diamond 430 where it can be determined whether sufficient resources are present in the target agent channel to receive the transaction. Although the scope of the present invention is not limited in this regard, in one embodiment this determination may be based on analysis of a credit tracker associated with the corresponding channel of the target agent. In some embodiments, this credit tracker may be associated with both the channel as well as the request type.

Still referring to FIG. 6, if it is determined that sufficient resources are available, control passes to block 440 where the transaction can be sent to the target agent channel. For example, the transaction can be sent to a transaction queue of the target channel for buffering until it is ready for processing by the target agent. Furthermore, because this transaction has consumed a queue resource of the target agent, credits associated with the target agent channel can be updated (block 450). For example, a credit tracker for the corresponding transaction queue can be decremented. Although shown with this particular implementation in the embodiment of FIG. 6, the scope of the present invention is not limited in this regard.

Figure 7:
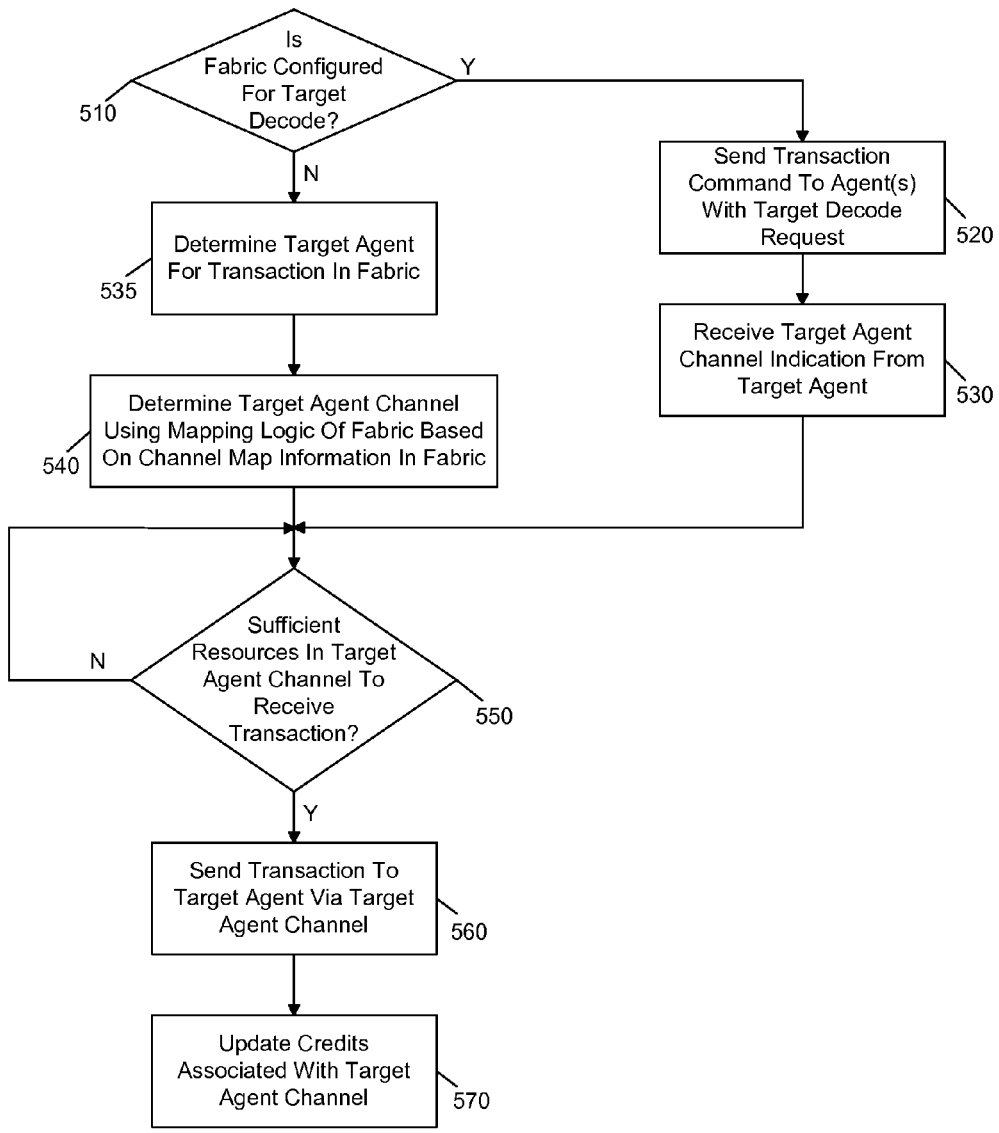
FIG. 7 is a flow diagram of a method for decoding a transaction in accordance with an embodiment of the present invention.

As discussed above, fabrics can have different decode options, including a fabric decode option and a target decode option. Referring now to FIG. 7, shown is a flow diagram of a method for decoding a transaction in accordance with an embodiment of the present invention. As shown in FIG. 7, method 500 may be used to decode a transaction to identify its appropriate destination. As seen in FIG. 7, method 500 may begin by determining whether the fabric is configured for target decode (diamond 510). In various embodiments, a fabric may be hard-coded configured for target decode operation, or target decode can be selected from one of multiple decode options, e.g., based on load, request type, agents involved or so forth.

If it is determined at diamond 510 that a target decode option is selected, control passes to block 520, where a transaction command can be sent to multiple agents with a target decode request. Accordingly, the various agents may perform target decode to determine whether the transaction is destined for it. Accordingly, each of the possible target agents may send a response message, e.g., a hit signal if it is the target agent. This hit signal may further include an indication of the channel mapping in the target agent for the given transaction type. Accordingly, at block 530 the fabric may receive a target agent channel indication from the target agent.

If instead the fabric is not configured for target decode, control passes to block 535 where the target agent can be determined for the transaction in the fabric itself, namely according to a fabric decode option. Although the scope of the present invention is not limited in this regard, in one embodiment this determination may be based on mapping tables present in the fabric. In addition to determining the target agent, it may also be determined in the fabric the channel of the target agent for the given transaction (block 540). More specifically, in one embodiment mapping logic of the fabric can be used to determine the target agent channel based on channel map information present in the fabric. Note that the programming of this target channel information can occur in different manners, e.g., by snooping, by express configuration cycles or in another manner such as reflecting back from the agent to the fabric.

Still referring to FIG. 7, control thus passes to diamond 550, where it can be determined whether sufficient resources are available in the target agent channel to receive the transaction. As above, this determination can be based on a credit tracker associated with the corresponding channel and transaction type. If such resources are available, control passes to block 560 where the transaction can be sent to the target agent via the target agent channel. And accordingly, credits associated with this target agent channel can be updated, e.g., decremented, as seen at block 570.

Figure 8:
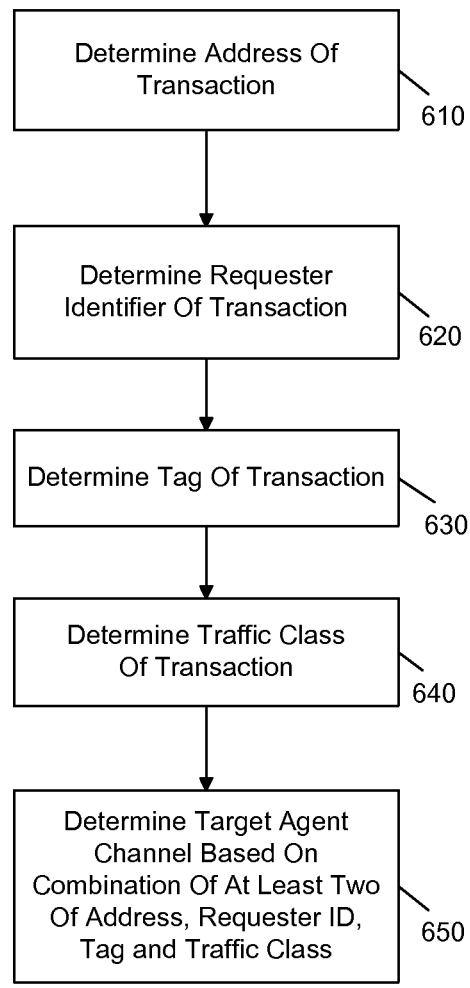
FIG. 8 is a flow diagram of attribute-based operations to determine a proper channel mapping in accordance with an embodiment of the present invention.

As further described above, different mapping operations can be performed in determining an appropriate channel of a target agent to receive a transaction. Referring now to FIG. 8, shown is a flow diagram of an example of various attribute-based operations to determine a proper channel mapping in accordance with an embodiment of the present invention. As shown in FIG. 8, method 600 may be performed by logic of a given decoding entity, e.g., in a fabric or in a target agent. In the embodiment shown in FIG. 8, various attributes of a transaction, namely various request attributes, can be analyzed to determine a channel mapping. More specifically as seen in FIG. 8, from information obtained, e.g., in a request for a transaction, various attributes can be determined. Namely in this embodiment, an address associated with the transaction (block 610), a requester identifier associated with the transaction (block 620), a tag of the transaction (block 630), and a traffic class of the transaction (block 640) can be determined. Then a channel mapping can be performed. More specifically, as seen at block 650 a target agent channel can be determined based on a combination of at least two of these attributes, namely, address, requester ID, tag and traffic class. Although shown with these particular attributes, understand the scope of the present invention is not limited in this regard, and in other implementations more or fewer such attributes can be considered. Furthermore, in different implementations differing orders of analysis of these attributes can be performed to select an appropriate channel of a target agent to receive a transaction.

To further explain channel mapping in accordance with an embodiment of the present invention, an example of channel mapping based on a combination of command attributes to map transactions onto channels in a target agent is now described.

Assume that the two agents of FIG. 5 have the following configuration.

Master Agent0 has one function with two channels that are virtual channels. Channel mapping is based on traffic class.

Channel0 is VC0 of agent 0. TC0-2 are mapped to Channel0(VC0).

Channel1 is VC1 of agent 0. TC3-7 are mapped to Channel1(VC1).

Target Agent1 has four channels using a combination of requester ID, address, tag, and traffic class for channel mapping.

Function0 has a requester ID of 10h and a base address register memory space from 32'h0001_0000 to 32'h000A_FFFF.

Function1 has a requester ID of 11h and a base address register memory space from 32'h00C0_0000 to 32'h00CF_FFFF.

Channel0 uses tag-based channel mapping for Function0. All TCs are supported in Channel0 (there is no TC/VC map). This channel has a memory range of 32'h0001_0000 to 32'h0003_FFFF. Completions are mapped with tag values of 00h-7Fh. Configuration transactions to Function° are only supported on Channel0.

Channel1 uses tag-based mapping for Function0. All TCs are supported in Channel1 (there is no TC/VC map). This channel has a memory range of 32'h0004_0000 to 32'h000A_FFFF. Completions are mapped with tag values of 80h-FFh.

Channel2 is a traffic class mapped virtual channel (VC0) of Function1. TC/VC map has TC0 mapped to Channel2 (VC0).

Channel3 is a traffic class mapped Virtual Channel (VC1) of Function1. TC/VC map has TC1-7 is mapped to Channel3 (VC1).

Assume with this channel mapping arrangement, Agent0 sends a configuration write from Channel0 to Bus/Device/Function number (BDF)=10h using TC=0 and tag=A0h. By decoding this request based on the above channel mapping rules, it can be determined that the transaction targets Agent1, Channel0. More specifically, this determination can come about as the target BDF matches the requester ID of Function0, and since Function0 only supports configuration transactions on Channel 0, the transaction is sent to Channel0. In this example, the tag attribute is a "do not care," and is not used for decode of this transaction.

Next assume that Agent 0 sends a memory write from Channel0 to Addr=32'h00C2_0000 using TC=2 and Tag=00h. By decoding this request based on the above channel mapping rules, it can be determined that the transaction targets Agent1, Channel3. Here, the memory range first may be decoded to identify that Function 1 is the target and thereafter, a traffic class decode operation identifies the proper virtual channel, channel3(VC1).

Next assume that Agent 0 sends a memory write from Channel1 to Addr=32'h0001_6000 using TC=6 and Tag=A0h. By decoding this request based on the above channel mapping rules, it can be determined that the transaction targets Agent1, Channel0. Here, performing a memory range decode operation identifies that the target is Function 0 channel 0. Note that per the above channel mapping rules, tag and traffic class do not affect decode of this transaction.

Finally, assume that Agent 0 sends a completion from Channel 0 to BDF=10h using TC=0 and Tag=90h. By decoding this request based on the above channel mapping rules, it can be determined that the transaction targets Agent1, Channel1. First, performing a target BDF decode indicates that the target BDF matches the requester ID of Function0, and tag mapping identifies that Channel1 is the target of this completion. In this example, the traffic class is a "do not care" for this transaction. Note that the decode function above may be implemented in the target agent or the fabric depending upon fabric implementation. If the fabric does not use a target decode mechanism, then the fabric may perform the channel mapping. In such instances, the fabric may include channel map information, e.g., including target decode function definitions, memory ranges, and tag information. In implementations in which an agent is from a third party vendor, the vendor may provide this information, e.g., via a datasheet.

By defining channels over a single interface, IP agents can easily be reused in different systems. More specifically, various elements as discussed above may allow easy reuse of agents across different, e.g., SoC, designs. These elements may include a channel ID definition that is local and specific to a given interface. As such an IP designer can independently choose the number of channels required by the agent and define channel IDs accordingly. Because these IDs are local to its interface only, fabrics can map these channels to different channel IDs in different SoCs. The target channel ID depends on the target agent, which can define channels to be merged and channels to be given separate resources, even in the target agent. Furthermore, any command attribute can be used for channel mapping. Since the channel ID definition is local to a given agent, it can decide to differentiate channels based any command attribute that it requires for its functionality. Different systems can merge or use different attributes to map channels outside the agent, which allows the system to optimize the system resources/buffers as per a product's requirements. And, different agents of a system can perform channel mapping using different request attributes. For example, an IP designer can map channels based on address, function, tag, TC or any other command attribute, providing great flexibility in defining channels, e.g., channels based on a given IP agent's constraints/requirements.

In addition, channel mapping architecture allows for both fabric and target decode options. That is, as discussed above, different systems use different decode mechanisms in the fabrics, and an IOSF compliant agent can be designed to indicate its channel mapping as part of a target decode hit response signal. In systems using fabric decode, the fabric can mirror agent-specific channel mapping logic to determine the target channel of a given transaction. In this way, an agent can easily interoperate in systems using both fabric and target decode mechanisms. Finally, channel definition and mapping rules and related ordering rules can be defined such that agents can interoperate in different systems without creating any deadlock or ordering issues.

Thus embodiments provide a capability to allow channel mapping using fabric or target decode mechanisms. For every transaction, a target agent may indicate the desired channel on which it is to receive a transaction and a multi-bit "hit" signal can be sent by the target agent for this purpose (assuming a target decode option is used). In a fabric decode option, the fabric may minor each target agent's channel mapping to ensure that target agents still receive the transaction on their desired channel. Note that in various embodiments, a fabric may implement both fabric and decode options, e.g., for different transaction types or with respect to different target agents. As such, embodiments allow an IP designer to independently define channel requirements. And providing for target decode with channel mapping allows agents to be easily reused in different systems since in each system an agent can claim transactions as per its own channel mapping definition.

Figure 9:
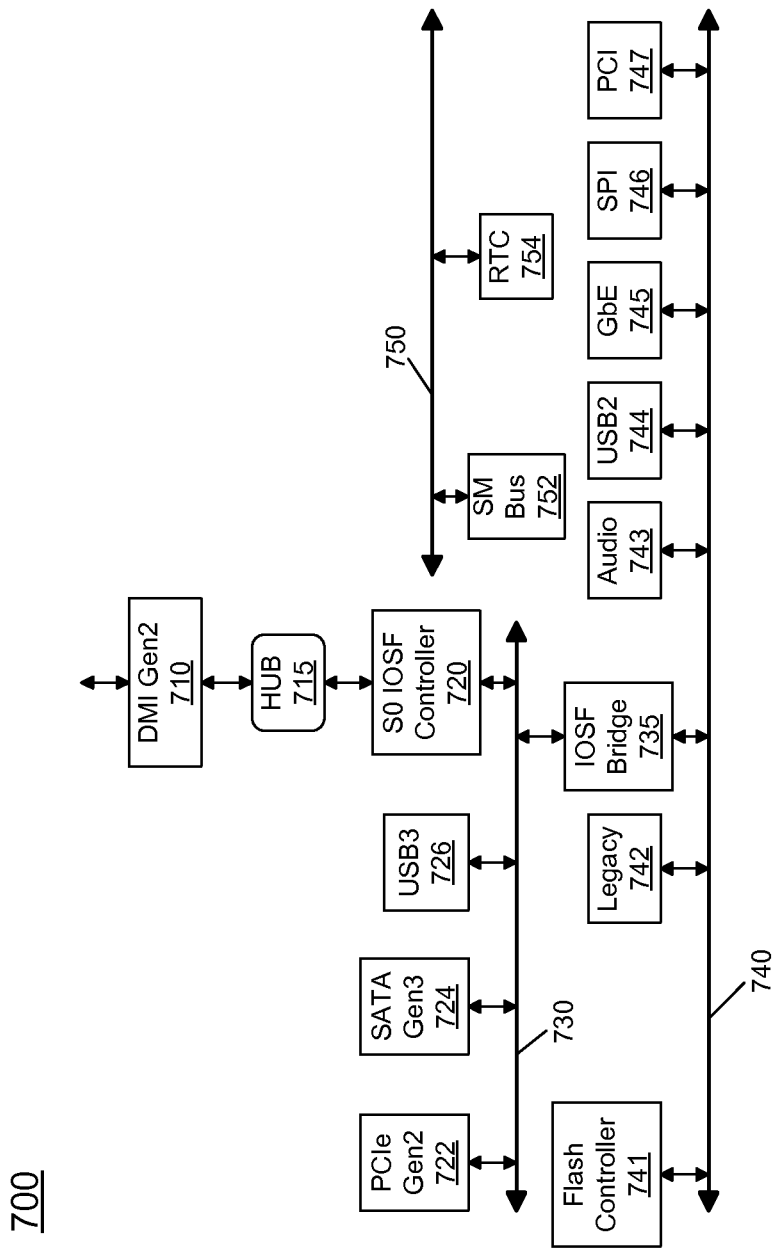
FIG. 9 is a more detailed block diagram of a portion of a SoC in accordance with an embodiment of the present invention.

Although the SoCs of FIGS. 3 and 4 are at a high level, understand that additional functionality may be present. Referring now to FIG. 9, shown is a more detailed block diagram of a portion of a SoC in accordance with an embodiment of the present invention. As shown in FIG. 9, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 9, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 9, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 9, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 9, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 9, understand the scope of the present invention is not limited in this regard.

Figure 10:
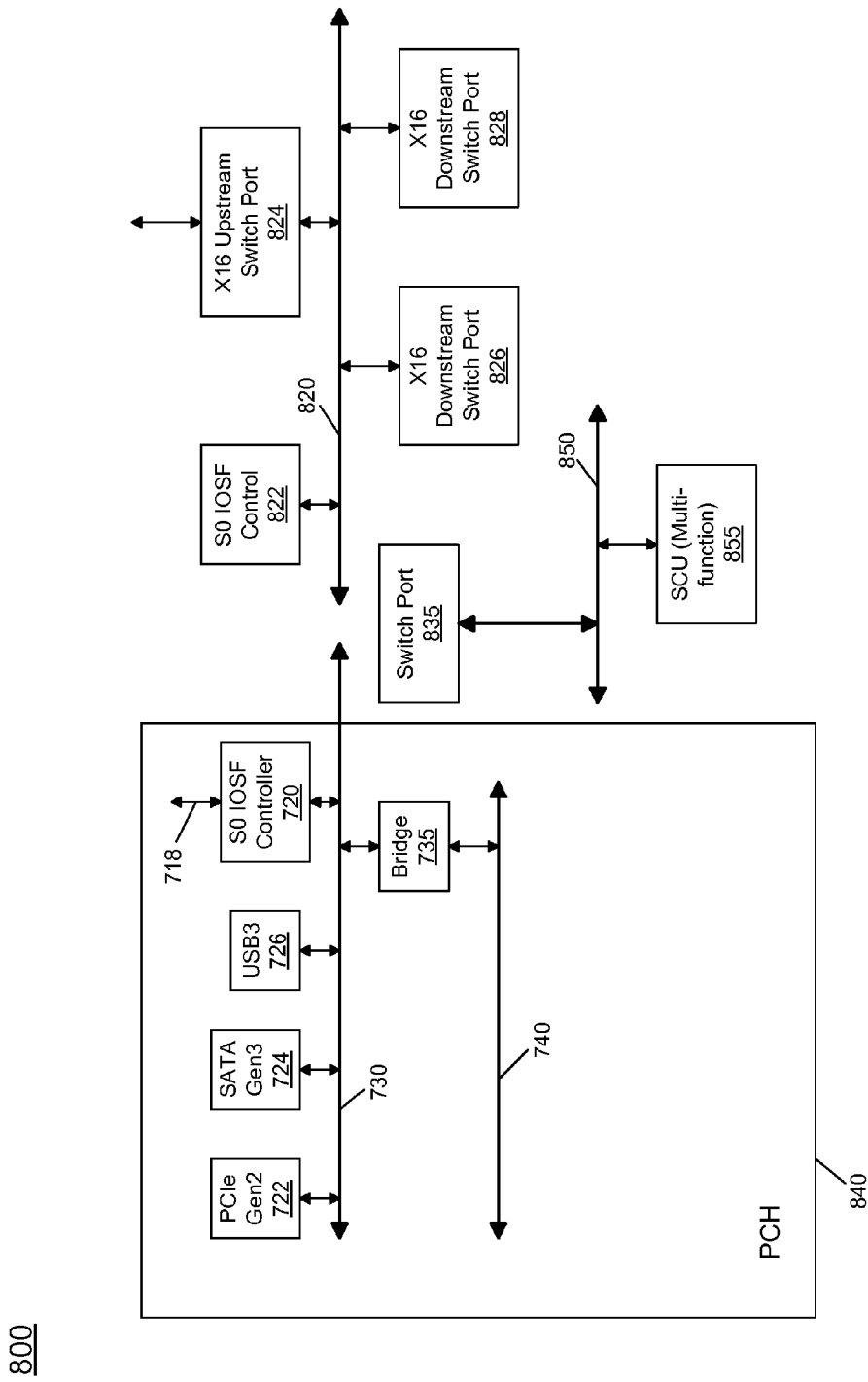
FIG. 10 is a block diagram of another SoC in accordance with an embodiment the present invention.

Still other implementations are possible. Referring now to FIG. 10, shown is a block diagram of another SoC in accordance with an embodiment the present invention. As shown in FIG. 10, SoC 800 may be configured for use, e.g., in server systems. As seen in FIG. 10, SoC may include a platform controller hub (PCH) 840, which may generally include components such as seen in the embodiment of FIG. 9. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 10).

As further seen in FIG. 10, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a semiconductor die including:
a first agent to issue a request for a transaction to a fabric coupled to the first agent, wherein the request includes a plurality of attributes of the transaction;
the fabric to receive the request including the plurality of attributes, determine a channel of a plurality of channels included in a second agent to receive the transaction, wherein the fabric is to map the transaction to the channel using at least one of the plurality of attributes according to a first decode option comprising a fabric decode option; and
the second agent coupled to the fabric to receive the transaction in the channel of the plurality of channels of the second agent if the channel has available resources to accept the transaction, wherein the second agent is to map the transaction to the channel using at least one of the plurality of attributes according to a second decode option comprising a target decode option.

2. The apparatus of claim 1, wherein the fabric includes a mapping logic coupled to a shadow channel map, the shadow channel map populated from information from the second agent, the mapping logic to map the transaction to the channel according to the first decode option.

3. The apparatus of claim 1, wherein the fabric is to issue a target decode request to the second agent for the request and to perform a fabric decode for a second request from another agent of a plurality of agents coupled to the fabric.

4. The apparatus of claim 1, wherein the fabric is to map the transaction using a first set of the plurality of attributes and map a second transaction destined for the second agent to a second channel of the plurality of channels of the second agent using a second set of the plurality of attributes.

5. The apparatus of claim 1, wherein the fabric is to receive the transaction via a first channel of the first agent having a first channel identifier and forward the transaction to the channel of the second agent having a different channel identifier.

6. The apparatus of claim 5, wherein the fabric is to update credits associated with the channel of the second agent responsive to forwarding the transaction.

7. The apparatus of claim 6, wherein the fabric includes a credit tracker associated with the channel of the second agent to store the credits.

8. The apparatus of claim 1, wherein the apparatus comprises a system on a chip (SoC).

9. A system-on-chip (SoC) comprising:
at least one core to execute instructions;
a coherent interconnect coupled to the at least one core;
a memory controller coupled to the coherent interconnect; and
a fabric coupled to the coherent interconnect,
the fabric to receive a request for a transaction from a first agent and obtain from the request at least two of an address of the transaction, a requester identifier of the transaction, a tag of the transaction, and a traffic class of the transaction,
wherein the fabric is to determine a channel of a target agent to receive the transaction based on the at least two of the address, the requester identifier, the tag, and the traffic class when a fabric decode option is active,
and to request at least the target agent to determine the channel via a target decode request when a target decode option is active.

10. The SoC of claim 9, wherein the fabric is to obtain the address of the transaction, the requester identifier of the transaction, the tag of the transaction, and the traffic class of the transaction from attribute information received with the request.

11. The SoC of claim 9, wherein the fabric is to send at least a portion of the transaction to a plurality of agents coupled to the fabric with the target decode request when the target decode option is active, and receive a hit signal from the target agent to indicate that the transaction is directed to the target agent.

12. The SoC of claim 11, wherein the fabric is to receive, in connection with the hit signal, an identification of the channel of the target agent.

13. The SoC of claim 9, wherein the SoC is to be incorporated in a server computer, the SoC including a storage controller to couple with at least one storage device and at least one bus to couple to at least one of a serial ATA (SATA) controller and a Peripheral Component Interconnect Express (PCIe) controller.

14. The SoC of claim 9, wherein the SoC is to be incorporated in a mobile device having Internet capability, wherein the SoC includes a memory controller to interface with a non-volatile memory of the mobile device, a first interface to interface with an audio device, and a second interface to interface with a universal serial bus (USB) device.

15. A non-transitory computer readable medium including data represented structures, when manufactured, to:
receive at least a portion of a transaction in a fabric from a first agent coupled to the fabric, the transaction including a command portion having a plurality of attributes;
determine a channel of a plurality of channels of a second agent coupled to the fabric to receive the transaction, according to one of:
a first decode option to be performed in the fabric to map the transaction to the channel using at least one of the plurality of attributes; and
a second decode option to be performed in the second agent by mapping the transaction to the channel using at least one of the plurality of attributes; and
forward the transaction to the channel if the channel has available resources to accept the transaction.

16. The non-transitory computer readable medium of claim 15, wherein the data represented structures, when manufactured, to update credits associated with the channel of the target agent responsive to forwarding the transaction.

17. The non-transitory computer readable medium of claim 15, wherein the data represented structures, when manufactured, to map the transaction in the second agent responsive to a target decode request from the fabric.

18. The non-transitory computer readable medium of claim 15, wherein the data represented structures, when manufactured, to send at least the portion of the transaction to a plurality of agents coupled to the fabric with a target decode request, and receive a hit signal from the second agent to indicate that the transaction is directed to the second agent.

19. The non-transitory computer readable medium of claim 15, wherein the data represented structures, when manufactured, to map the transaction using a first set of the plurality of attributes and map a second transaction destined for the second agent to a second channel of the plurality of channels using a second set of the plurality of attributes.

20. The non-transitory computer readable medium of claim 15, wherein the data represented structures, when manufactured, to map the transaction to the channel using an address, a requester identifier, and a tag of the transaction to identify at least two channels of the plurality of channels, and thereafter use a traffic class of the transaction to map the transaction to the channel.

21. An apparatus comprising:
a first intellectual property (IP) agent configured on a semiconductor die, the first IP agent to issue a request for a transaction destined to a second IP agent via a fabric, wherein the request includes a plurality of attributes of the transaction, including at least two of an address associated with the transaction, a requester identifier associated with the transaction, a tag of the transaction, and a traffic class of the transaction, and according to a channel mapping of the first IP agent;
the fabric configured on the semiconductor die, the fabric to forward the transaction to a particular channel of the second IP agent, wherein the particular channel is to be determined according to a channel mapping of the second IP agent, the channel mapping of the second IP agent according to at least two of the plurality of attributes of the transaction, and the channel mapping of the first IP agent different than the channel mapping of the second IP agent; and
the second IP agent configured on the semiconductor die to receive the transaction via the particular channel.

22. The apparatus of claim 21, wherein the fabric is to determine the particular channel according to a fabric decode.

23. The apparatus of claim 21, wherein the second IP agent is to determine the particular channel according to a target decode.

24. The apparatus of claim 21, wherein the channel mapping of the second IP agent is to be according to an address mapping, a requester identifier mapping, a tag-based mapping and a traffic class mapping.

* * * * *